United States Patent [19]

Brady

[11] 4,433,556

[45] Feb. 28, 1984

[54] PIPE FREEZING DEVICE

[75] Inventor: Welby D. Brady, Portland, Oreg.

[73] Assignee: Temp-Control Corporation, Portland, Oreg.

[21] Appl. No.: 312,523

[22] Filed: Oct. 19, 1981

[51] Int. Cl.³ .......................... F25D 3/00; F16L 55/10
[52] U.S. Cl. .......................................... 62/293; 138/89
[58] Field of Search ....................... 62/66, 259.4, 293; 138/35, 89, 97, 32; 285/45

[56] References Cited

U.S. PATENT DOCUMENTS

| 2,483,082 | 9/1949 | Young et al. | 62/293 X |
| 3,498,071 | 3/1970 | Tremont | 138/89 X |
| 3,559,423 | 2/1971 | Scheidler | 62/293 |
| 3,695,301 | 10/1972 | Pittman | 62/293 X |
| 3,742,723 | 7/1973 | Grise | 138/89 X |
| 3,926,006 | 12/1975 | Brooks et al. | 62/293 X |
| 4,220,012 | 9/1980 | Brister | 62/293 X |
| 4,267,699 | 5/1981 | Bahrenburg | 138/89 X |
| 4,309,875 | 1/1982 | Radichio | 62/293 X |

OTHER PUBLICATIONS

*Popular Science*, Jan. 1969, p. 67.

*Primary Examiner*—Stephen Marcus
*Assistant Examiner*—Mark John Thronson
*Attorney, Agent, or Firm*—Eugene M. Eckelman

[57] ABSTRACT

A tubular housing made up of a pair of sections forms a tubular inner compartment of a cross dimension larger than the outer diameter of a pipe in which water is to be frozen. The housing has opposite flanges arranged to be abutted together and bolt fasteners are provided in the flanges for releasably securing the housing sections together for installing and removing them laterally on a pipe. The end walls of the housing have openings arranged to fit around the pipe on which the housing is mounted and such openings have seals to provide a sealed engagement with the pipe. An inlet for freezing material extends into one side of the housing adjacent one end of the latter and an outlet for gas from the freezing material extends from the housing on the same side as the inlet and adjacent the other end of the housing. The two housing sections are symmetrically constructed whereby the inlet will be in one of the sections and the outlet will be in the other section.

1 Claim, 4 Drawing Figures

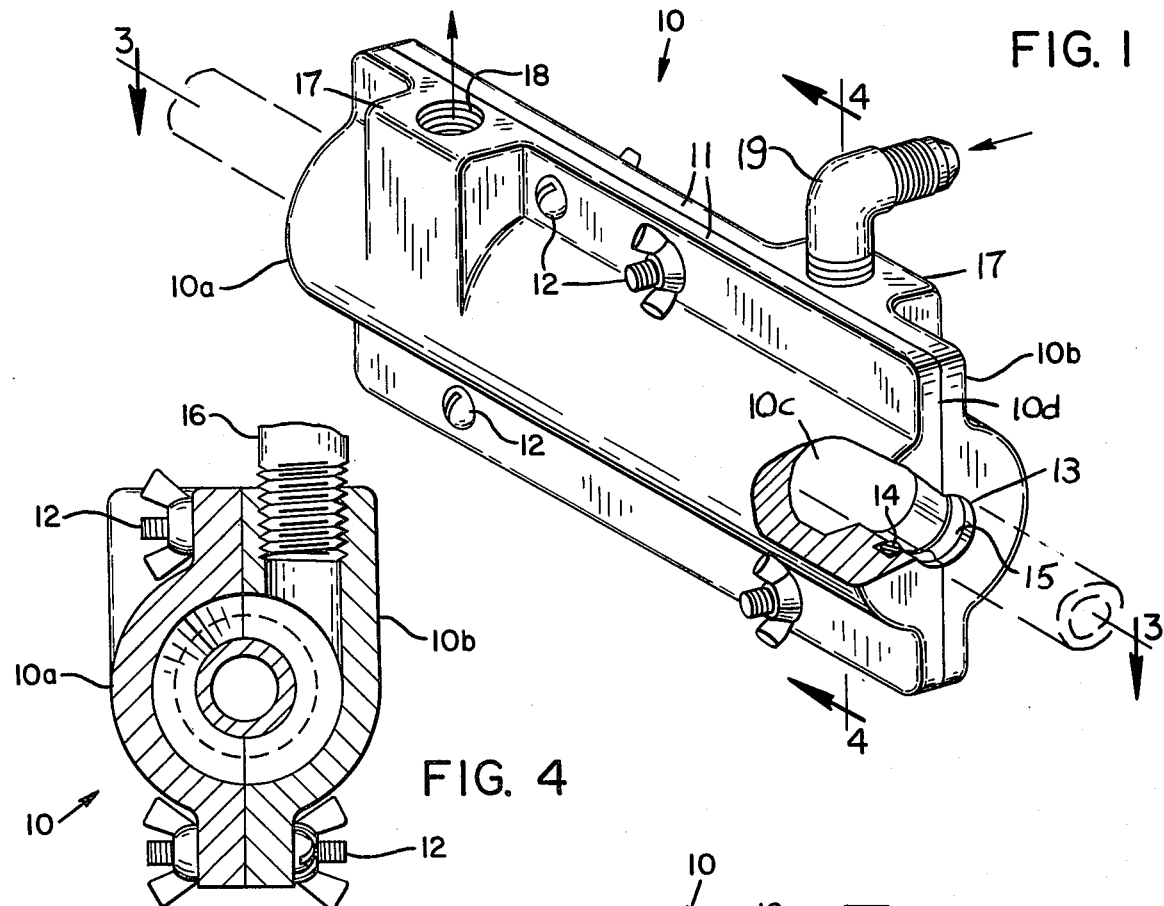
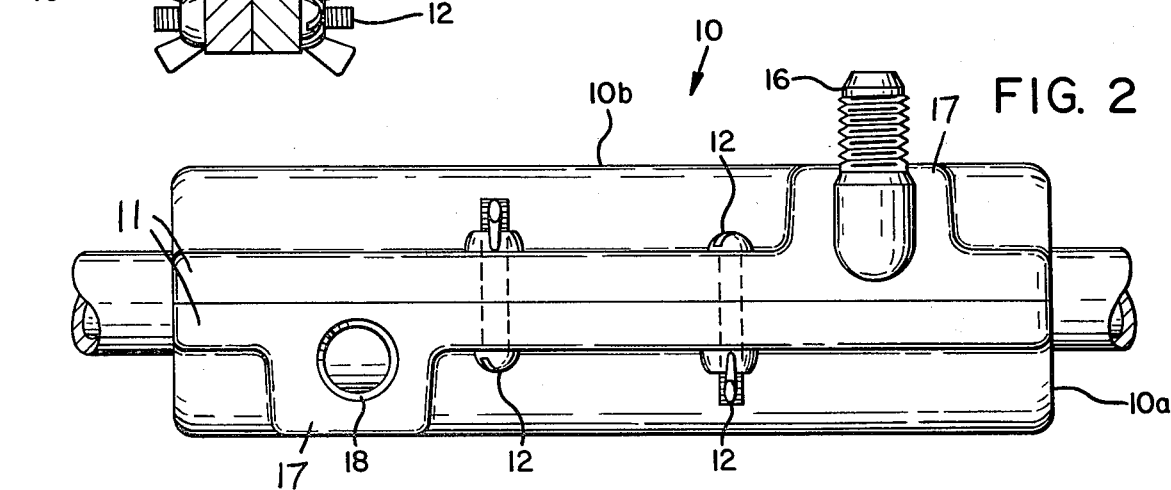
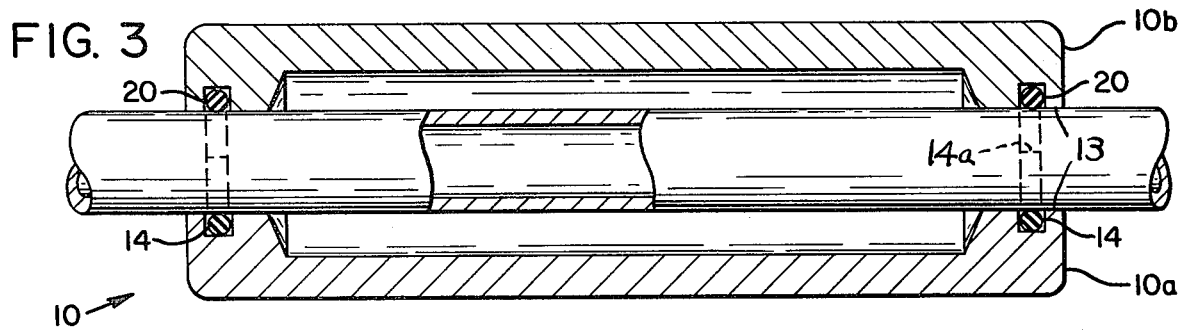

PIPE FREEZING DEVICE

BACKGROUND OF THE INVENTION

This invention relates to new and useful improvements in pipe freezing devices.

Devices have heretofore been provided for placement on a pipe for freezing water in a section of the pipe to provide water stoppage and thus eliminate the necessity of interrupting the service to other lines by closing off main lines or the like. Such prior devices have been found to possess certain faults which prevent them from being highly efficient in their particular usage and at the same time desirable from the point of economy of manufacture, ease of installation and removal from the pipe, and rugged and durable in use.

SUMMARY OF THE INVENTION

According to the present invention and forming a primary objective thereof, a pipe freezing device is provided having structural arrangement which overcomes disadvantages of prior structures, such pipe freezing device having a particular housing structure which makes it efficient in use, economical to manufacture, easy to install and remove on a pipe, and rugged and durable in use.

For the purpose of accomplishing these objectives, the device includes a tubular housing made up of a pair of sections forming an inner compartment of a diameter larger than the outer diameter of a pipe on which the device is to be mounted. The housing sections have opposite flanges arranged to be abutted together and releasably fastened by bolt fastening means. Also, the housing sections have end walls with openings arranged to fit around the pipe with seal means to provide a sealing engagement with the pipe. One of the housing sections has an inlet adjacent one end thereof for admitting freezing material and the other housing section has an outlet adjacent the other end for discharging gas from the freezing material. The outlet is provided on the same side of the housing as the inlet for efficient use of the freezing material. The housing sections are symmetrically constructed for economy of manufacture.

The invention will be better understood and additional objects and advantages will become apparent from the following description taken in connection with the accompanying drawings.

BRIEF DESCRIPTION OF THE DRAWINGS

FIG. 1 is a perspective view of a freezing device of the invention, such device being shown in assembled relation and applied to a pipe for freezing water in the pipe, the pipe being shown in phantom lines;

FIG. 2 is a top plan view of the device;

FIG. 3 is a longitudinal sectional view taken on the line 3—3 of FIG. 1; and

FIG. 4 is a cross sectional view taken on the line 4—4 of FIG. 1.

DETAILED DESCRIPTION OF A PREFERRED EMBODIMENT

With particular reference to the drawings, the pipe freezing device of the instant invention is designated generally by the numeral 10 and is constructed of two sections 10a and 10b. The main body portion of the housing is tubular, with the interior thereof enlarged relative to a pipe on which the device is to be applied so as to form an inner compartment 10c, the pipe being shown in broken lines in FIG. 1 and in full lines in FIGS. 2, 3 and 4. Each of the housing sections has oppositely extending flanges 11 arranged to receive bolts 12 for releasably fastening the sections together.

The end walls of the housing have openings 13 for receiving a pipe, and such end walls at the openings have O-rings 14 spaced a short distance inwardly from the ends and seated in grooves 15. The housing sections 10a and 10b have a flat side 10d by means of which the two sections are firmly abutted together in a sealing engagement, the openings 13 at the ends of the housing being arranged to be aligned when the housing sections are connected together. In this same regard, the O-rings 14 are provided in half sections so that the end edges 14a thereof, FIG. 3, terminate at the flat sides 10d of the housing sections and form a seal around the pipe. It is to be understood that a positive seal is not necessary between the housing sections as well as between the seals 14 and the pipe since a slight leakage of gas from the freezing material will not materially reduce the efficiency of the device. Thus, with the device cast from metal with reasonable tolerance, and with the O-ring sections 14 being substantially in engagement, a sufficient enclosure is provided for temporarily holding the freezing material.

Each of the housing sections has a lateral extension or enlargement 17 through which an opening 18 extends. Such openings extend from the exterior of the housing to the inner chamber 10c, with one opening serving as an inlet and the other opening as an outlet for freezing material. The opening which serves as the inlet is provided with a fitting 19 for connection to a conduit arranged to lead to a supply of freezing material. The outlet can usually remain open and not carry a fitting. Extensions 17 with the openings therein are provided at opposite ends of the housing sections whereby the pipe is subjected to a substantially long exposure of the freezing material.

In a preferred construction, the housing sections 10a and 10b are of symmetrical construction, with the extensions 17 disposed adjacent the ends thereof whereby when the sections are reversed and clamped together, the inlet and outlet openings are spaced apart and on the same side. As will be seen, this same side disposition of the inlet and outlet openings is important, and to insure that this arrangement is maintained during use, the holes for the fastening means 12 on one set of flanges 11 of the housing are spaced a different distance apart than the holes on the other flanges of the housing so that the two housing sections, being symmetrically constructed, cannot be connected together in any other way except with the inlet and outlets disposed on the same side and in spaced relation at opposite ends of the housing.

In the use of the present device, the housing sections 10a and 10b are disconnected and placed around a pipe at the point at which freezing of the water in the pipe is to take place. The device is firmly clamped on the pipe by the fastening means 12, and a liquid freezing material such as Freon is admitted in the inlet 19. The freezing material, being of a low boiling point, turns into gas and produces a freezing temperature in the chamber 10c. Such gas circulates along the full length of the chamber and out the outlet to produce an efficient freezing step.

To provide a rugged tool and also to provide good insulation around the chamber 10c, the device is cast with thick walls such as about one centimeter thick. Furthermore, the distance between the inlet and outlet is at least 10 centimeters, thus providing a long span for the travel of the gas between the inlet and outlet openings and thus providing a positive ice plug that cannot be unseated by water pressure in the line. When the device is used on a horizontal pipe, the openings 18 are directed upwardly. This requires the freezing material to travel downwardly through the inlet opening and horizontally along the full length of the chamber and then out the outlet to provide an efficient freezing step. When the device is applied to upright pipes, the housing is positioned with the inlet 19 below the outlet whereby the freezing material will similarly circulate efficiently through the housing between the inlet and outlet.

It is to be understood that the form of my invention herein shown and described is to be taken as a preferred example of the same and that various changes in the shape, size and arrangement of parts may be resorted to without departing from the spirit of my invention, or the scope of the subjoined claims.

Having thus described my invention, I claim:

1. A device for freezing water in a length of pipe comprising
    a tubular housing having a pair of sections forming a tubular inner compartment of a cross dimension larger than the outer diameter of a pipe and at least 10 centimeters in length to form a path for a freezing material,
    said housing sections being of symmetrical construction,
    said housing sections having opposite flanges arranged to be abutted together,
    bolt fastening means in said flanges for releasably securing said housing sections together for installing and removing them laterally on a pipe,
    end walls on said housing sections having an opening arranged to fit around a pipe on which said housing is mounted,
    seal means in said openings to provide a sealing engagement with a pipe,
    an inlet for a freezing material extending into one side of said housing adjacent one end of the latter,
    and an outlet for gas from the freezing material extending from said housing on the same side of said housing adjacent the other end of the latter providing free circulation of freezing material around the pipe for at least said 10 centimeters to efficiently form an ice plug in the pipe,
    said inlet being in one section and said outlet being in the other section,
    said inlet and outlet extending through a portion of said flanges,
    said bolt fastening means having selected spacing through said flanges providing only one possible clamped position of said symmetrical housing sections so that said inlet and outlet will always be disposed at opposite ends and on the same side.

* * * * *